Jan. 31, 1933.　　　A. POLLAK　　　1,895,863
WEIGHING SCALE
Filed Aug. 30, 1930　　　4 Sheets-Sheet 1
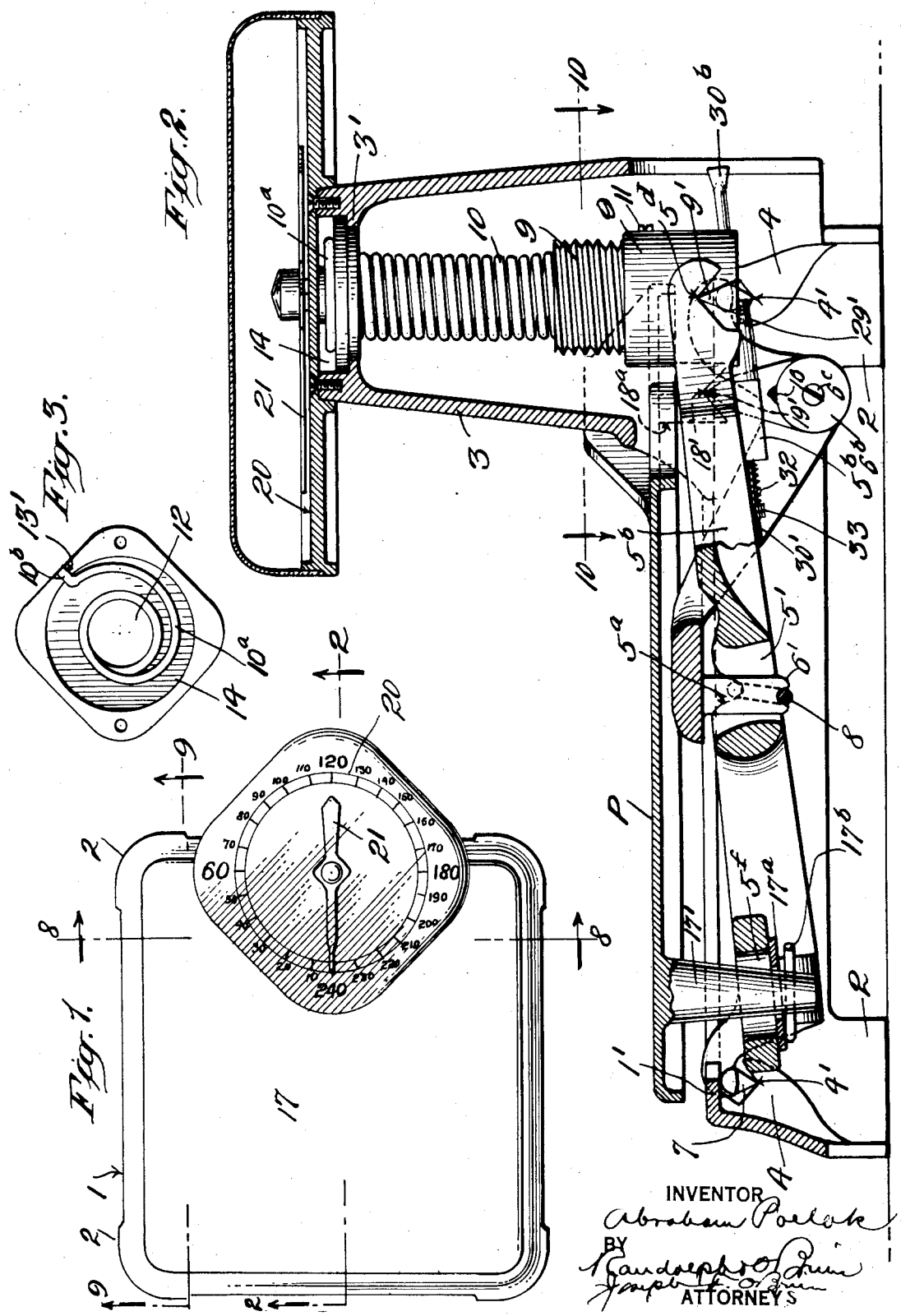
INVENTOR
Abraham Pollak
BY
Randolph O'Brien
Joseph O'Brien
ATTORNEYS

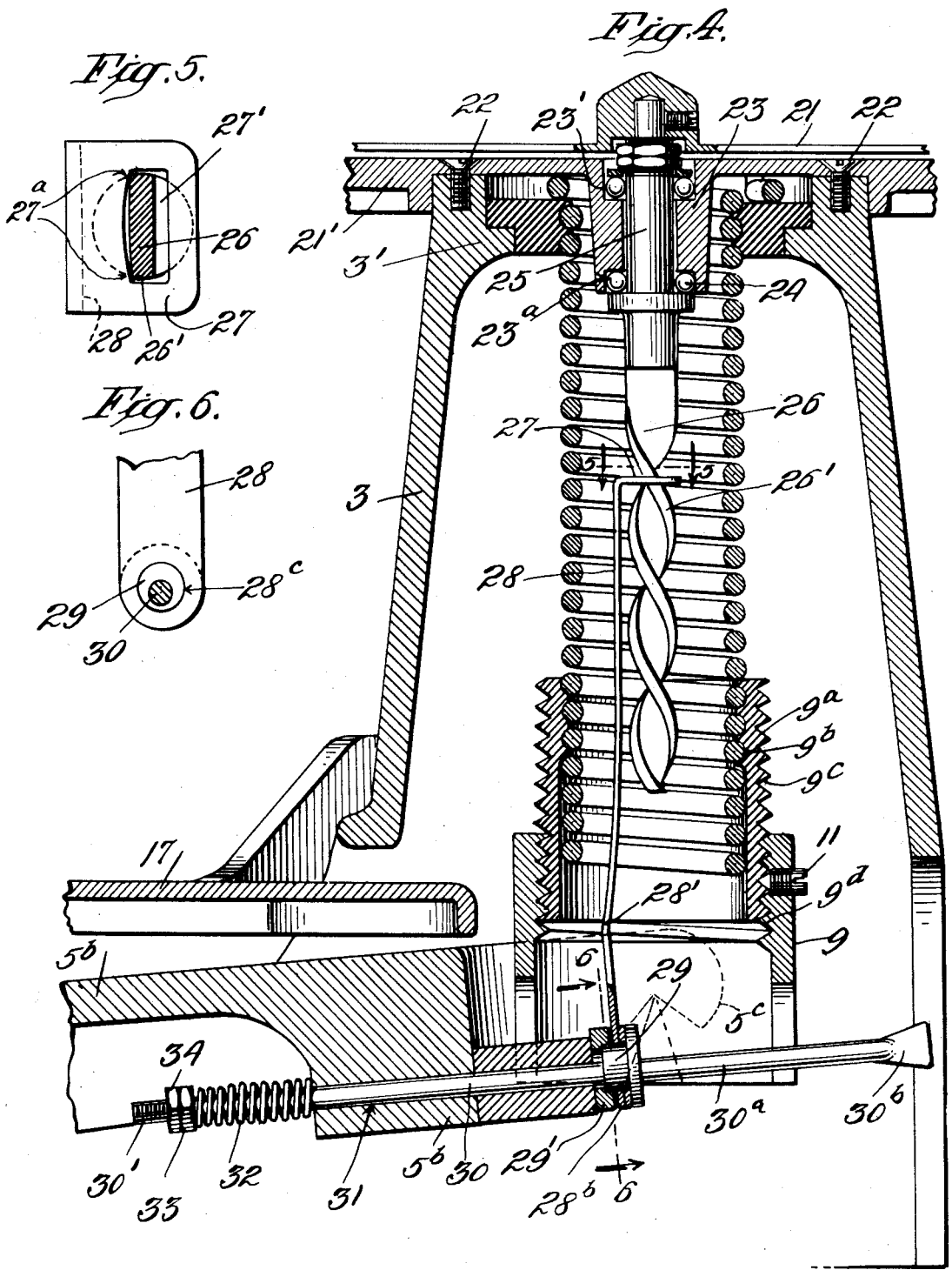

Jan. 31, 1933.   A. POLLAK   1,895,863
WEIGHING SCALE
Filed Aug. 30, 1930   4 Sheets-Sheet 3

INVENTOR
A. Pollak
BY Randolph
Joseph
ATTORNEY

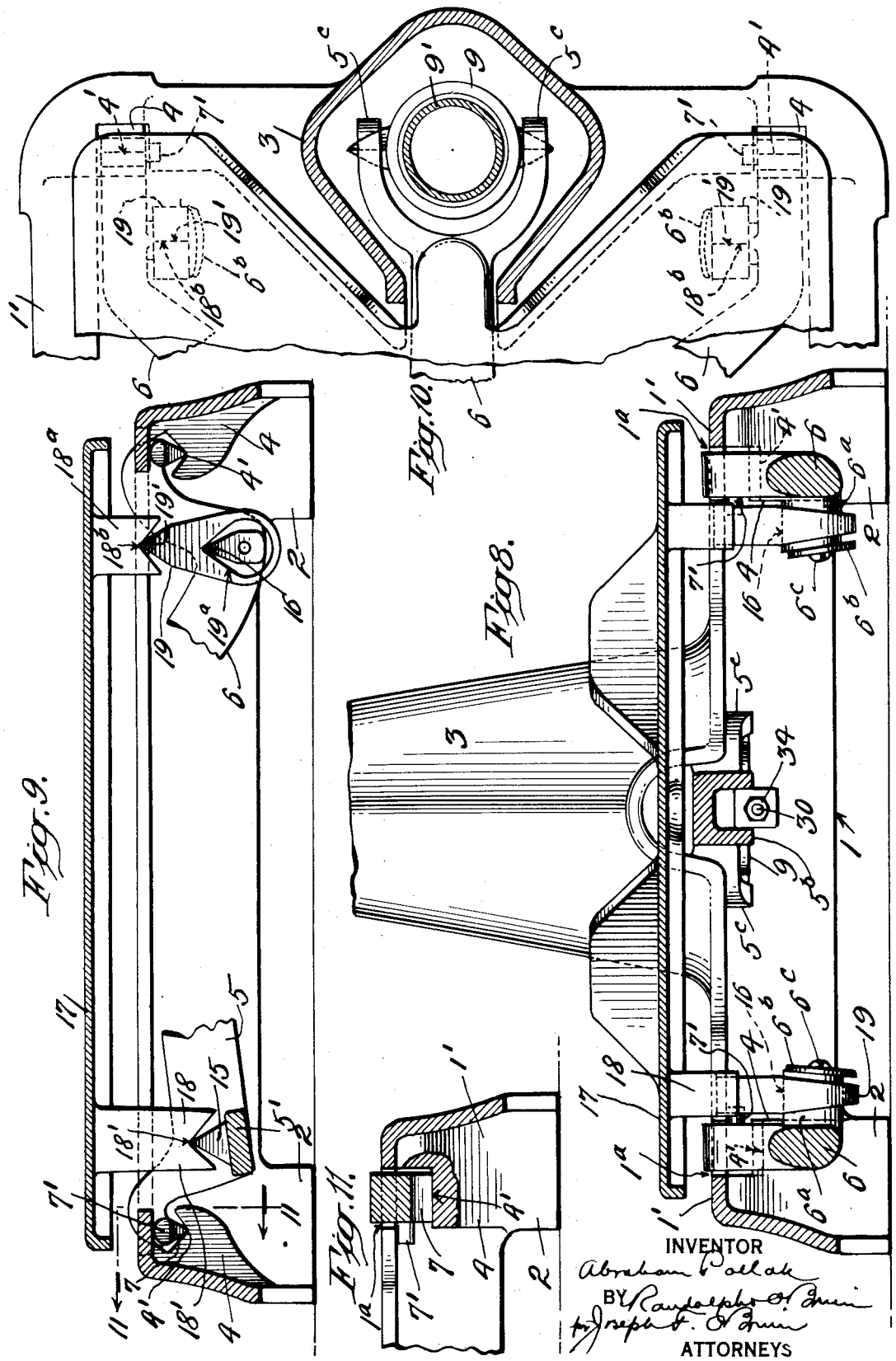

Patented Jan. 31, 1933

1,895,863

UNITED STATES PATENT OFFICE

ABRAHAM POLLAK, OF FAR ROCKAWAY, NEW YORK

WEIGHING SCALE

Application filed August 30, 1930. Serial No. 478,822.

This invention relates to improvements in weighing scales and particularly to a simplified scale construction for use in bathrooms and the like for weighing persons.

Objects of this invention are to produce a scale in which mechanism is employed and parts are so arranged so as to cause the height of the platform above the floor to be reduced and to enable a platform to be disposed so closely to the floor as to minimize danger of injury due to slipping off the platform during the weighing operation; in which an indicating element is movable over a graduated dial preferably disposed in a horizontal plane and the vertical movement of the weighing beam will be directly and positively transmitted thereto without the use of toothed gears and the like; in which two members, one being a helicoidal member mounted for movement about a vertical axis and the other mounted for movement in a vertical plane will have direct meshing engagement to transmit the movement of one to the other and preferably to convert the vertical movement of a weighing beam to horizontal movement of an indicating element; in which a helicoidal element or spiral is mounted to extend vertically at the axis of the dial and utilized as a transmission element and is directly connected with said indicating element; and in which said helicoidal element cooperates with a nut or sleeve movable vertically in a rectilinear line by weighing beam to turn the helicoidal element or spiral and to transmit such movement directly to indicating element without the interposition of gears or the like; in which movement of the weighing beam and the size of the scale parts may be reduced and said reduced movement of the weighing beam will be sufficient when transmitted to an indicator to move the same over the dial; to provide a scale construction in which lost motion in the indicator actuating mechanism is eliminated, thus avoiding inaccuracies in the scale due to lost motion; to provide a scale of the type having a spring as the weight-balancing element with means for providing ready and quick adjustment of said spring in relation to the load and graduated dial; to provide means for adjustment between the helicoidal transmission element and the weighing beam whereby final adjustment may be made between the indicating element and the dial to enable the setting of the indicating element at zero independently of any adjustment of the weight-balancing spring and without the use of a compensating spring; to provide a scale having a system of levers and a platform so arranged and mounted as to provide an interlocking connection between said levers and the frame and to enable the complete fastening of all parts by a single fastening element between the platform and one of said levers.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a scale embodying my invention;

Fig. 2 is a vertical section on the line 2—2 of Fig. 1, looking in the direction of the arrow, with the weighing spring and cooperating parts shown in side elevation;

Fig. 3 is a view, in plan, of the spring column with the dial removed;

Fig. 4 is an enlarged vertical central section on the line 2—2 of Fig. 1, looking in the direction of the arrow, through the column and through the spring as shown in Fig. 2;

Fig. 5 is a section on the line 5—5 of Fig. 4, looking in the direction of the arrow;

Fig. 6 is a section on the line 6—6 of Fig. 4, looking in the direction of the arrow;

Fig. 8 is a section on the line 8—8 of Figs. 1 and 7 respectively;

Fig. 9 is a section on the line 9—9 of Fig. 1, looking in the direction of the arrow;

Fig. 10 is a section on the line 10—10 of Fig. 2, looking in the direction of the arrow; and Fig. 11 is a section on the line 11—11 of Fig. 9, looking in the direction of the arrow.

Figure 7:
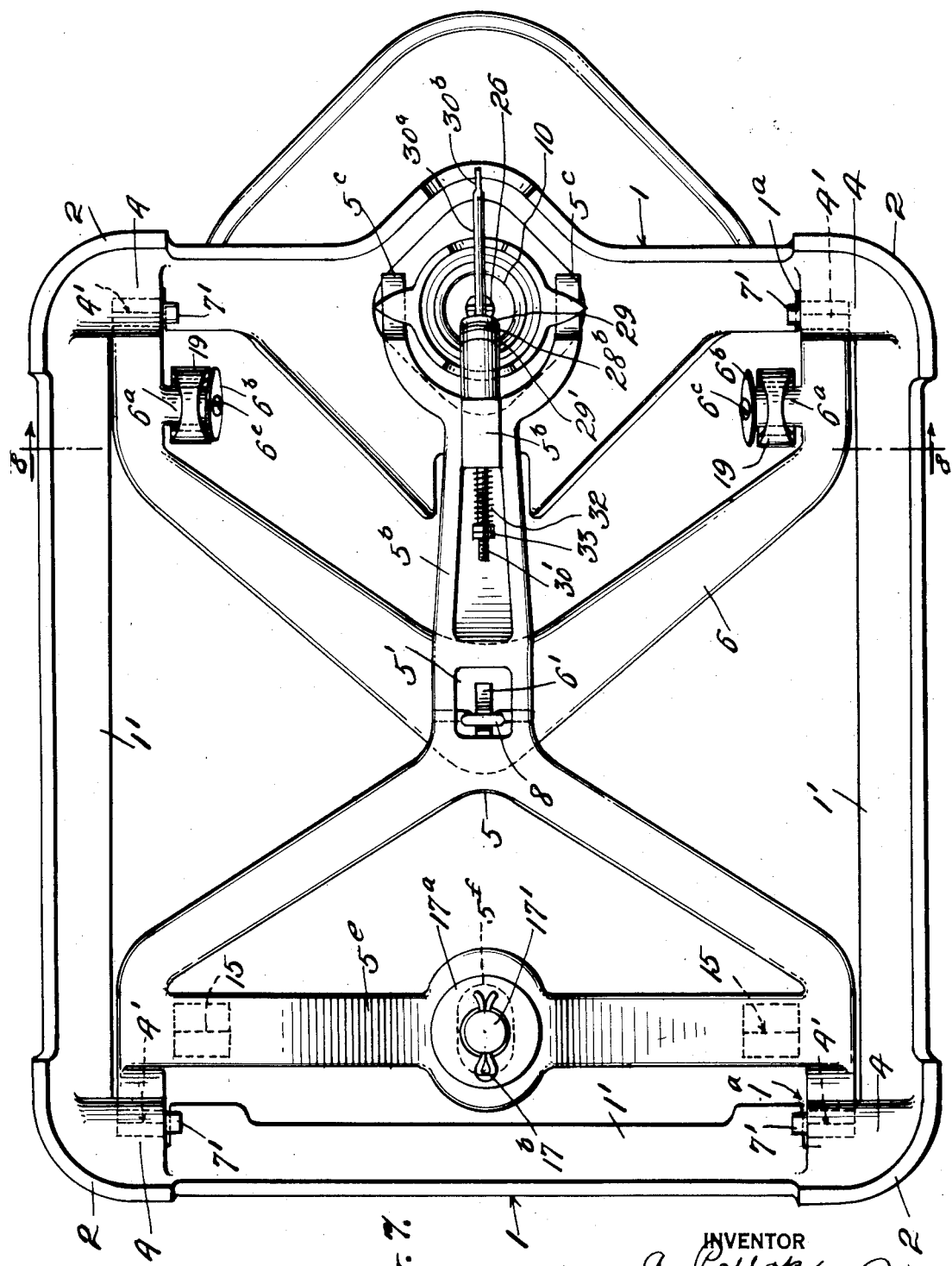
Fig. 7 is an inverted view, in plan, of the scale.

Referring now to these drawings, which illustrate a preferred embodiment of my invention, 1 indicates a base member or casting rectangular in conformation provided at its corners with four feet 2 and having at its upper edge a horizontally-disposed marginal flange 1' interrupted at the front of the base member to permit the provision of an integral dial column 3. The said base member 1 is provided at each corner with integrally-formed brackets 4 having one member of a knife-edge bearings, which, as shown, comprises knife-edge bearing-notches 4' arranged adjacent and beneath notches 1ª in the flange 1', thus enabling the entrance and interlocking with the knife-edge bearing notches of knife-edge pivot members formed on a system of levers. As illustrated, I provide a pair of levers 5 and 6, each triangular in conformation having adjacent to the base-angles knife edge pivot members 7 adapted to be slipped into and interlock with the knife-edge notches 4' of the bracket 4 and each of said pivot members is provided with a pin 7' capable of forming an interlocking connection beneath the flange 1'. These levers are arranged, except for the interlocking connection with the base, in substantially conventional form, the front lever being arranged to extend above the rear lever and one of said levers being arranged to cross and to have a swinging connection with the other at a central point. As shown, the lever 5 is provided with an opening 5' and the lever 6 is provided with a depending notched element 6' which rests upon a wire loop 8 suspended from notches 5ª in the lever 5. Any weight imposed upon the lever 6 will thus be transmitted to the lever 5 and to a weighing arm 5ᵇ which is formed integrally therewith. Said weighing arm 5ᵇ has at its outer end a bifurcated front end or fork 5ᶜ which is connected through knife-edge bearings with a cylindrical spring-mounting head 9, the fork 5ᶜ being provided at each side with one element of a knife-edge bearing and the other knife-edge bearing element being provided on the spring-mounting head 9. As illustrated, the fork is provided with knife-edge bearing notches 5ᵈ and the spring-mounting head is provided with the knife-edge pivot members 9'. The cylindrical spring-mounting head 9 has a connection with the lower end of a weight-balancing spring 10 which is capable of fine screw-threaded adjustment while the spring and head are connected and mounted in the scale and without any rotation of the spring or of that portion of the head having the knife-edge bearing members mounted thereon. To accomplish this object, the spring-mounting head is formed in two parts, one of which comprises a double-threaded rotatable auxiliary mounting-sleeve member 9ª which has an internal spiral or thread 9ᵇ connected with the spring 10 and an external thread 9ᶜ connected with an internal thread 9ᵈ on the non-rotatable primary member 9 which is provided with a set-screw 11 engageable with the thread of the auxiliary sleeve member to lock the parts together in any suitable adjusted relationship.

Said spring 11 is supported at its end at the head or top 3' of the column 3 and, as illustrated, said opposite end is preferably partially connected by threading the spirals thereof into an axial or central internally-threaded hole or opening 12 in the said head to receive the same. The upper end of the spring 11 is passed through said opening 12 in the horizontally-disposed head 3' of the column 3 which at said upper end is provided with an enlarged depression or chamber 14 in which an upper coil 10ª of the spring seats. The edge of said head 3' is also provided with a notch 13' within which the end 10ᵇ of the spring 10 is fastened.

The platform is supported on the system of levers in a substantially conventional manner. The base-arm 5ᵉ of the rear lever 5 is provided with a pair of knife-edge pivot members 15 and the forward ends of the lever 6 are provided with a pair of knife-edge pivot members 16 all of which, as shown, are formed integrally with the said lever members on the upper surfaces thereof. The rear end of the platform 17 is provided with a pair of notched bearing elements 18, each having a knife-edge bearing or notch 18' bearing upon the rear knife-edge pivot members 15. The platform 17 is also provided with front knife-edge bearing members 18ª having bearing notches 18ᵇ which contact with knife-edge pivot members 19' on an intermediate sleeve 19 which is also provided with a knife-edge bearing notch 19ª contacting with the knife-edge pivot members 16 on the lever 6. The knife-edge pivot members 16 are formed on a hub 6ª and the sleeve is held on the hub by a washer 6ᵇ and screw 6ᶜ.

The platform will thus be supported to transmit any weight superimposed thereon to the system of levers which will, in turn, transmit the same to the weighing beam or arm 5ᵇ, the other end of which is supported on a weight-resisting or balancing spring 10 so mounted that any weight on the platform will expand or stretch the same in proportion to the amount of weight superimposed upon the platform.

It is desirable that all the parts of the scale be capable of ready and quick assembly and disassembly and that they may be interlocked without affecting the operation of the scale and, in the preferred embodiment of my invention, I provide means which, in coöperating with the interlocking connection between the frame and the levers 6, will connect and lock all the parts of the scale together. For this purpose an arm 5ᵉ of the lever 5 is provided with an elongated opening 5ᶠ and the platform 17 is provided with a downward projection 17′ which extends through the elongated opening 5ᶠ and is provided beneath the lever with a washer 17a and a cotter pin 17b is passed through a hole in the projection 17′.

The platform is thus securely fastened to the levers and the levers being, as hereinabove described, interlocked with the base member or casting 1, all the parts will be capable of ready and quick assembly and disassembly, it being understood that by the removal of the cotter pin 20, the platform may be lifted and the levers 5 and 6 will then be accessible for removal, if desired.

An important feature of my invention comprises my novel indicator-moving mechanism, which I will now describe:

I dispose a dial 20 of the scale in horizontal position, an indicator 21 is movable in a horizontal plane over the dial and the vertical movement of the weighing beam is converted directly into horizontal movement for the indicator 21 without the use of gears or like elements. It is also desirable to move this indicator without lost motion; also to provide means which will enable a relative short rectilinear movement of the scale beam to produce a complete turning of the indicator and which, with a reduced or minimum of vertical movement will enable complete revolution of the indicator, thus enabling the height of the dial column and the required movement of the weighing beam to be reduced, and I am enabled to accomplish these objects by the use of extremely simple mechanism which is not likely to get out of order and which may be readily adjusted independently of the balancing spring and without any compensating spring to provide a setting movement of the indicating element at zero, whereby the adjustment of the balancing spring in relation to the weight may be accomplished independently of the setting of the indicating element to zero and vice versa.

In the preferred embodiment of my invention illustrated, the head 3′ of the column is provided with a dial plate 21′ fastened to the head 3′ by screws 22 and having an axial bearing 23 having at the upper and lower end thereof ballbearing grooves 23′, 23ᵃ provided with balls 24 and I mount within this bearing 23 a shaft 25 having at its lower end a helicoidal member or spiral 26, the wings or threads 26′ of which are passed through and mesh with a sleeve or nut 27. As shown, this is accomplished by utilizing a flat wing spiral and passing the wing thereof through a hole 27′ in the nut or sleeve 27 which is formed integrally with a flat semi-resilient connecting rod or member 28 disposed in a plane parallel to the hole 27′ and mounted at its lower end on a projection 29 connected to the weighing arm or beam 5ᵇ. The corner edges 27ᵃ of the hole 27′ are normally maintained in contact with a surface of the wing by providing a bend 28′ in the integral connecting element 28. The said element 28 is mounted to permit vertical adjustment in relation to the weighing beam or arm 5ᵇ and the spiral 26 so as to permit the indicating element actuated by the turning of said spiral to be set independently of the adjustment of the balancing spring 10 and without the use of any compensating spring or like element. To account for such adjustment, the end 28ᵇ of the connecting member 28 is provided with a bore 28ᶜ which is mounted upon an adjusting eccentric 29 which is mounted in a head 29′ and formed integrally with a rod 30 mounted in a bearing aperture 31 in the arm 5ᵇ and preferably retained against accidental movement by a spring 32 compressed by a nut 33 on the threaded end 30′ of the rod 30 and locked by a lock-nut 34. The rod 30 is provided with a forward extension 30ᵃ having a flattened end 30ᵇ adapted to be grasped by the fingers of the user and turned so as to swing the eccentric about the axis of the rod. Such swinging will obviously cause a vertical movement of the sleeve or nut in relation to the spiral which will thus cause a turning of the shaft 25 and will thus enable a setting of the indicator in relation to the graduations on the dial. I am thus enabled, as above-mentioned, to provide setting adjustment independently of the adjustment of the balancing spring and to accomplish such adjustment without the use of compensating springs or the like.

Having described my invention, I claim:—

1. A weighing scale embodying, in combination, a load-receiving platform, a weighing-beam movable up and down in a vertical plane, weight-balancing means, a graduated dial, a weight-indicating element movable in a horizontal plane over said dial, and means for converting the vertical movement of said weighing beam into the horizontal movement of the indicating element comprising a helicoidal member disposed in a vertical plane and another member engageable with and movable vertically relatively to said helicoidal member, one of said members being connected with the said indicating element and the other with the weighing beam to convert the vertical movement of the weighing beam into horizontal movement for said indicating element.

2. A weighing scale embodying, in combination, a load-receiving platform, a weighing-beam movable up and down in a vertical plane, weight-balancing means, a graduated dial, a weight-indicating element movable in a horizontal plane over said dial, and means for converting the vertical movement of said weighing beam into the horizontal movement for the indicating element comprising a member connected to the indicating element, said member being mounted for rotation about a vertical axis and having a helicoidal thread, and an actuating member having a meshing engagement with the said thread of said helicoidal member, and connected to said weighing-beam for movement therewith in a vertical plane only.

3. A weighing scale embodying, in combination, a load-receiving platform, a weighing beam movable up and down in a vertical plane, weight-balancing means, a graduated dial, a weight-indicating element movable in a horizontal plane over said dial, means for converting the vertical movement of said weighing beam into the horizontal movement of the indicating element comprising a spiral connected to said indicating element and having a flat wing-thread, and an actuating sleeve having a meshing engagement with the said flat wing thread of said spiral and having a connection to said weighing-beam for movement therewith in a vertical plane only, said actuating member being arranged to maintain contact with one surface of the thread of said helicoidal member during the upward and downward movement of said actuating member.

4. A weighing scale embodying, in combination, a load-receiving platform, a weighing beam movable up and down in a vertical plane, a weight-balancing spiral spring, a graduated dial, a weight-indicating element movable in a horizontal plane over said dial, and means for converting the vertical movement of said weighing beam into the horizontal movement of the indicating element comprising a helicoidal member disposed in a vertical plane axially within said spring and another member engageable with and movable vertically relatively to said helicoidal member, one of said members being connected with the said indicating element and the other with the weighing beam to convert the vertical movement of the weighing beam into horizontal movement for said indicating element.

5. A weighing scale embodying, in combination, a load-receiving platform, a weighing-beam movable up and down in a vertical plane, a weight-balancing spiral spring, a graduated dial, a weight-indicating element movable in a horizontal plane over said dial, and means for converting the vertical movement of said weighing beam into the horizontal movement for the indicating element comprising a member connected to the indicating element, said member being mounted for rotation about a vertical axis within said spring and having a helicoidal thread, and an actuating member having a meshing engagement with the said thread of said helicoidal member and connected to said weighing-beam for movement therewith in a vertical plane only.

6. A weighing scale embodying, in combination, a load-receiving platform, a weighing beam movable up and down in a vertical plane, a weight-balancing spiral spring, a graduated dial, a weight-indicating element movable in a horizontal plane over said dial, means for converting the vertical movement of said weighing beam into the horizontal movement of the indicating element comprising a spiral mounted axially within said spring, connected to said indicating element and having a flat wing-thread, and an actuating sleeve having a meshing engagement with the said flat wing-thread of said spiral and having a connection to said weighing-beam for movement therewith in a vertical plane only, said actuating member being arranged to maintain contact with one surface of the thread of said spiral during the downward movement of said actuating member.

7. A weighing scale embodying, in combination, a load-receiving platform, a weighing beam movable up and down in a vertical plane, a graduated dial, weight-indicating means actuated by said weighing beam, a weight-balancing spiral spring, means for fixedly supporting said spring at its upper end and adjustable connecting means for connecting the lower end of said spring to said weighing beam comprising a non-rotatable element having a connection with said weighing beam and a rotatable member having a thread connection with said spring and with said non-rotatable member.

8. A weighing scale embodying, in combination, a base member and provided with one element of a knife-edge bearing, a pair of levers, each having knife-edge bearing elements adapted to cooperate with the bearing members on the base member and having means for providing a releasable interlocking connection with the said base member, said levers also having additional knife-edge bearing members extending upwardly, a platform having knife-edge bearing elements supported on the knife-edge elements of the levers, and means for fastening the platform to the levers to fasten the base member, levers and platform together.

In witness whereof, I have signed my name to the foregoing specification.

ABRAHAM POLLAK.